(12) United States Patent
Declerck et al.

(10) Patent No.: US 8,950,292 B2
(45) Date of Patent: Feb. 10, 2015

(54) ROD TENSIONING DEVICE

(75) Inventors: Didier Declerck, Achères (FR); Valérie Loiseau, Bois d'Arcy (FR)

(73) Assignee: Aktiebolaget SKF, Gothenburg (SE)

( * ) Notice: Subject to any disclaimer, the term of this patent is extended or adjusted under 35 U.S.C. 154(b) by 1029 days.

(21) Appl. No.: 13/030,923

(22) Filed: Feb. 18, 2011

(65) Prior Publication Data

US 2011/0197716 A1   Aug. 18, 2011

(30) Foreign Application Priority Data

Feb. 18, 2010   (EP) .................................... 10305167

(51) Int. Cl.
| | |
|---|---|
| *B25B 17/00* | (2006.01) |
| *B23P 19/06* | (2006.01) |
| *B25B 29/02* | (2006.01) |
| *F03D 11/00* | (2006.01) |

(52) U.S. Cl.
CPC .............. *B23P 19/067* (2013.01); *B25B 29/02* (2013.01); *F03D 11/00* (2013.01); *Y02E 10/722* (2013.01)
USPC .............. 81/57.38; 81/10; 254/29 A; 411/433

(58) Field of Classification Search
USPC .............. 81/177.2, 180.1, 185, 121.1, 177.5, 81/124.6, 124.7, 125, 124.3, 124.4, 184, 81/57.38, 54, 55, 57.34, 57.22, 454, 455; 280/766.1; 279/14, 143, 144, 145, 74, 279/50; 254/29 A; 29/452
See application file for complete search history.

(56) References Cited

U.S. PATENT DOCUMENTS

| | | | | |
|---|---|---|---|---|
| 3,995,828 A | * | 12/1976 | Orban | .......................... 254/29 A |
| 5,749,691 A | * | 5/1998 | Campbell | ...................... 411/433 |
| 7,275,462 B2 | * | 10/2007 | Faus et al. | ..................... 81/57.38 |

FOREIGN PATENT DOCUMENTS

| | | | | |
|---|---|---|---|---|
| FR | 2841304 A1 | 12/2003 | | |
| GB | 2143608 A | * | 2/1985 | .............. B25B 29/02 |

* cited by examiner

*Primary Examiner* — Monica Carter
*Assistant Examiner* — Melanie Alexander
(74) *Attorney, Agent, or Firm* — Bryan Peckjian; SKF USA Inc. Patent Dept.

(57) ABSTRACT

A device is for tensioning a rod having a threaded portion and includes an actuator adapted to provide a tensioning axial force and a tie-rod adapted to transmit the axial force from the actuator to the threaded portion of the rod. The tie-rod includes a plurality of jaws, the jaws being movable radially between a closed position at which the jaws are engaged with the rod threaded portion and an open position at which the jaws are disengaged from the threaded portion, each jaw having an outer surface. A locking element includes a sleeve slidable axially along the tie-rod and disposable about the jaws, the sleeve having an inner frustoconical surface contactable with the outer surfaces of the jaws.

14 Claims, 5 Drawing Sheets

ROD TENSIONING DEVICE

CROSS-REFERENCE TO RELATED APPLICATIONS

This application claims priority to European patent application no. 10305167.8, filed on Feb. 18, 2010, which is incorporated fully herein by reference

BACKGROUND OF THE INVENTION

The present invention relates to tensioning devices, and more particularly to devices for tensioning a rod before the rod is tightened in position.

Pre-stressed threaded rods used to tighten two mechanical structures together are known. These threaded rods may be used particularly in wind turbines or nuclear reactors in order to maintain firmly two mechanical structures together. The tensioning of the rods can be done by applying a tightening torque to nuts resting axially on the surfaces of the structures to be tightened. This tightening method does not allow controlling precisely the axial force transmitted to the rod, because of friction between the nut in contact with the surface of the part to be tightened and between the nut and the rod. Moreover, this tightening method introduces torsional residual stresses into the threaded rod, which results in the necessity of using oversize threaded rods. In addition, such a tightening generally leads to a significant risk of damage to the threads of the nut and of the rod cooperating together during tightening. The surface against which the nut is resting during its rotation at the time of tightening may also be damaged.

In order to avoid these disadvantages, a threaded rod may be axially tightened before tightening a nut on the surface of a structure to be fastened. The nut blocks the rod when the axial force transmitted to the rod is released. The rod is thus pre-stressed only along its axis. An actuator can be used in order to transmit an axial force to the rod. Thus, after the nut is positioned on the threaded portion of the rod to be tensioned, the actuator is positioned so as to surround the threaded portion and the nut. Large mechanical assemblies must often be maintained by several threaded rods. The implementation of such tensioning devices requires, especially when the number of threaded rods is important, multiple screwing and unscrewing of the ties which makes the assembly operations long and difficult to realize.

French patent application FR 2841304 (SKF) discloses a rod tensioning device comprising an actuator, a tie-rod transmitting an axial force from the actuator to the threaded rod. The tie-rod includes two jaws, which can move radially between a closed position, in which the tie-rod is engaged with the threaded portion of the rod, and an open position, in which the jaws are disengaged from the threaded rod. The tensioning device includes a locking element sliding inside the jaws in order to close or open the jaws. The locking element includes radial flanges in order to open the jaws. When the locking element is moved downward towards the threaded rod, the jaws are disengaged from the threaded rod and when the locking element is moved upward, the jaws are engaged with the threaded rod. The dimensions of such a tensioning device make the tensioning of several threaded rods on a small device difficult and the tensioning device is also uneasy to manipulate. Moreover, the jaws are not guided very precisely.

SUMMARY OF THE INVENTION

The present invention seeks to provide a radially compact improved rod tensioning device allowing an easier tensioning of the rod and which may thus be arranged together with other identical tensioning devices for tensioning simultaneously several threaded rods.

In an embodiment of the present invention, a rod tensioning device comprises an actuator adapted to provide a tensioning axial force, a tie-rod capable of transmitting the axial force from the actuator towards the threaded portion of a rod, and a locking element.

The tie-rod includes a plurality of jaws which can move radially between a closed position, in which the tie-rod is engaged with the threaded portion of the rod, and an open position, in which the jaws are disengaged from the threaded portion of the rod, and the locking element includes a sleeve, sliding axially around the jaws. The sleeve includes an internal frustoconical surface in contact with an external mating surface of the jaws.

Such a tensioning device is particularly compact since the sleeve is mounted outside the jaws. Moreover, the frustoconical contacts improve the guiding of the jaws.

Preferably, there are three substantially identical jaws, each circumferentially extending over 120°. The three jaws can be linked together by at least one connector.

For example, the at least one connector may include a plurality of pins, each pin cooperating with a spring inserted in a hole located on each of the jaws in order to elastically urge two adjacent jaws towards each other in the closed position. More specifically, each jaw has a hole and the at least one connector includes three pins, each pin being attached to a separate one of the jaws and disposed partially within the hole of another one of the jaws, and three springs, each spring being disposed within a separate one of the jaw holes and arranged to bias the pin disposed within the hole so as to bias the jaws toward each other in the closed position.

Preferably, each jaw includes a cylindrical portion having an internal threaded surface capable of cooperating with the threaded portion of the rod and a frustoconical portion delimited by two edge guiding surfaces having a stepped profile.

In an embodiment, the sleeve may comprise three radially protruding elements, each element being adapted to slide between the edge guiding surfaces of two adjacent jaws.

Preferably, each edge guiding surface includes an upper part and a lower part. For example, the upper part delimits with the upper part of the guiding surface of an adjacent jaw an upper guiding passage and the lower part delimits with the lower part of the guiding surface of the adjacent jaw a lower guiding passage. The upper guiding passage is advantageously narrower than the lower guiding passage.

The jaws are in the closed position when the radially protruding elements slide between the lower parts of said guiding surfaces and in the open position when the radially protruding elements slide between the upper parts of the guiding surfaces.

The actuator may comprise a tubular sleeve surrounding the threaded portion of the rod, a cylinder in contact with the tubular sleeve and a piston sliding axially inside the tubular sleeve. The piston includes a frustoconical surface in contact with a corresponding frustoconical surface of the jaws.

Preferably, the actuator may comprise means for supplying a fluid under pressure into an annular chamber for urging the piston and the tie-rod with the jaws in the closed position so as to provide the tensioning axial force.

For example, a spring can be mounted within the actuator for urging the piston so as to exert the axial force F on the rod 1.

Preferably, the frustoconical portion of each jaw includes a shoulder extending radially towards the actuator. The shoulder is adapted to rest against a washer.

Three springs located at 120° from each other may be mounted in the piston towards the washer, in order to allow a slight adaptation of the axial position of the jaws.

In a further aspect, the invention provides a rim for tensioning threaded rods. The rim may comprise a semi-circular annular plate bearing at least two tensioning devices as described above and a locking plate. The locking plate may be adapted to act simultaneously on the locking element of the tensioning device.

Preferably, the rim comprises driving means adapted to cooperate with wrenches cooperating with nuts mounted on the threaded rods.

The rim may be a semi-circular monobloc (i.e., extending about 180°) or a substantially circular monobloc (i.e., extending about 360°), the term "monobloc" as used herein meaning a component or element of substantially one-piece construction.

The invention also relates to a tensioning system comprising two identical rims, each being a semi-circular monobloc and assembling means adapted to assemble the rims together in a reversible way. In other words, the two semi-circular rim may be connected end-to-end in a first arrangement or alternatively one rim may be turned or "flipped" over such the opposing ends of the one rim are connected with the adjacent ends of the other rim in a second arrangement.

BRIEF DESCRIPTION OF THE SEVERAL VIEWS OF THE DRAWINGS

The present invention will be better understood with the aid of the detailed description of a number of embodiments given by way of non-limiting examples and illustrated by the attached drawings, in which.

DETAILED DESCRIPTION OF THE INVENTION

Figure 1:
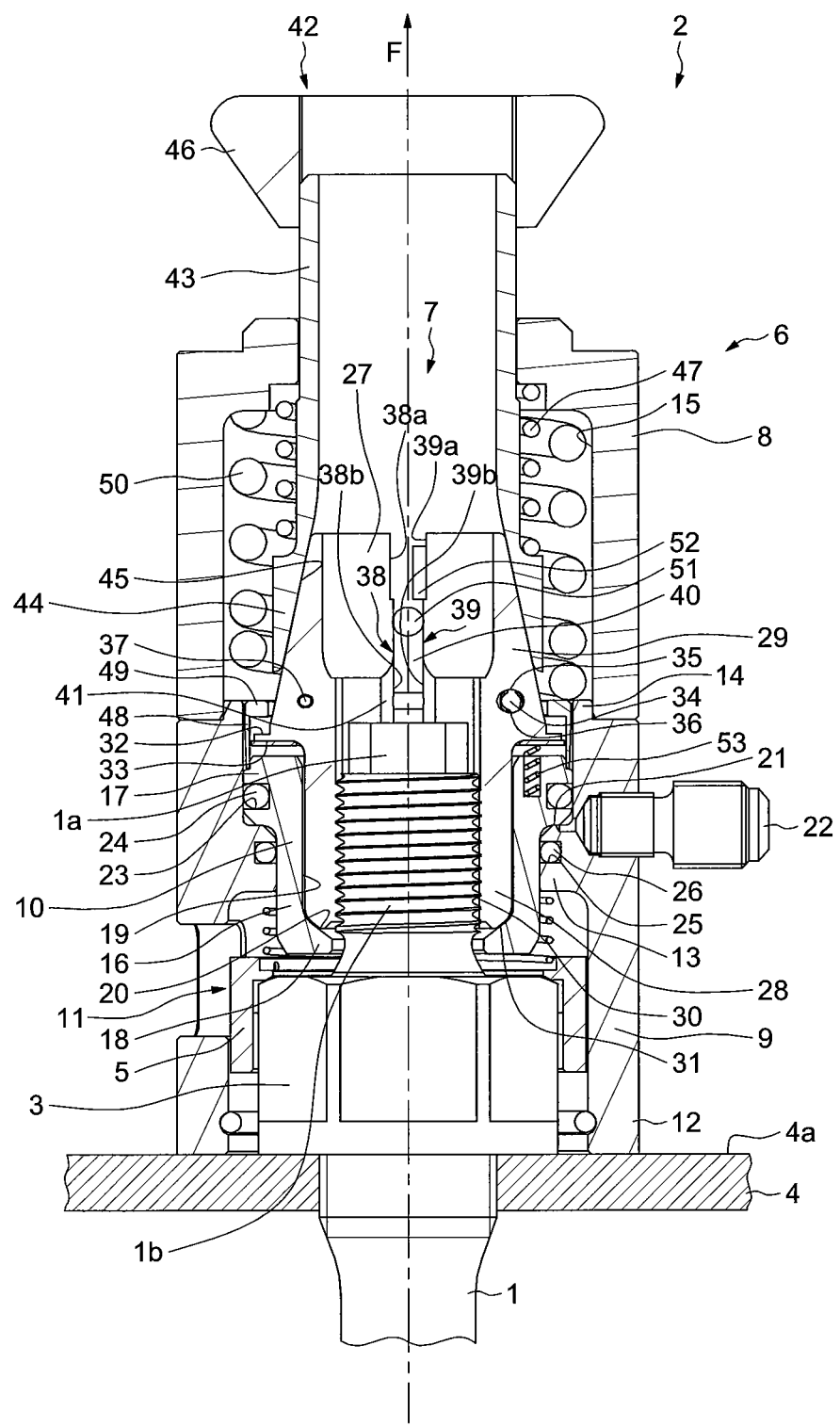
FIG. 1 is an axial half-section of a tensioning device according to the invention in the condition "jaws opened & tensioning pressure off"

Referring first to FIG. 1, which illustrates an example of an embodiment of a tensioning device according to the invention, a threaded rod 1 is to be axially pre-stressed using a tensioning device referred generally as 2 and thereafter maintained in the pre-stressed state by a nut 3 resting against a surface 4a of a structure 4 to be tightened. The threaded rod 1 includes a head 1a and a threaded portion 1b. A tightening wrench 5 is mounted around on the nut 3. The wrench 5 surrounds the nut 3 and includes internal surfaces in contact with the corresponding external surfaces of the nut 3. Generally, the wrench 5 includes a hexagonal central hole (not illustrated).

The tensioning device 2 comprises an actuator 6 adapted to provide an axial force F to a threaded portion 1b of the rod 1 via a tie-rod 7.

The actuator 6 includes a cylinder 8, a tubular sleeve 9 in contact with the cylinder 8 and a piston 10. The actuator 6 contacts the surface 4a of the structure 4 to be tightened via the tubular sleeve 9 surrounding the end of the threaded rod 1. A passage 11 is provided in the tubular sleeve 9 for non-illustrated means capable of acting on the nut 3 for rotating the latter towards the surface 4a. The non-illustrated means are inserted through the passage 11 in order to cooperate with the wrench 5 and to rotate the nut 3. The nut 3 can thus be tightened against the surface 4a.

The piston 10 slides axially inside the tubular sleeve 9. The tubular sleeve 9 has an axial portion 12 and a radial flange 13. The radial flange 13 extends internally towards the piston 10. The axial portion 12 includes a rib 14 extending axially towards the opposite direction of the surface 4a to be tightened. The rib 14 contacts the internal surface 15 of the cylinder 8 so as to radially maintain the tubular sleeve 9 on the cylinder 8 by centering the tubular sleeve 9 inside the cylinder 8. The piston 10, of a generally annular shape, includes a tubular portion 16, a flange 17 extending radially towards the tubular sleeve 9, and a radial flange 18 extending radially towards the rod 1. The tubular portion 16 has an inner surface 19 and the radial flange 18 has an inner frustoconical surface 20. The tubular portion 16 contacts the radial flange 13 of the tubular sleeve 9 and the flange 17 contacts the axial portion 12 of the tubular sleeve 9.

An annular chamber 21 is located between the flange 17 of the piston 10 and the radial flange 13 of the tubular sleeve 9. Means 22 are adapted to supply a fluid under-pressure into the annular chamber 21 in order to urge the piston 10 so as to exert the axial force F on the rod 1.

An annular groove 23 is provided on the radially external surface of the flange 17. A seal element 24 is mounted within the groove 23 in contact with the internal surface of the axial portion 12 of the tubular sleeve 9. An annular groove 25 is provided on the radially internal surface of the radial flange 13. A seal element 26 is mounted within the groove 28 in contact with the external surface of the tubular portion 16 of the piston 10. The seals 25 and 26 ensure the sealing of the annular chamber 21.

The tie-rod 7 includes substantially three identical jaws 27. Each jaw 27 includes a cylindrical portion 28 and a frustoconical portion 29. The cylindrical portion 28 has an internal threaded surface 30 adapted to cooperate with the threaded portion 1b and a frustoconical surface 31 capable of contacting the corresponding surface 20 of the piston 10. By way of a non-limiting example, the frustoconical portion 29 may comprise a shoulder 32 resting against a washer 33. The washer 33 allows a homogenously distribution of stress into to jaws 27. Each of the three jaws 27 is a piece of revolution centered on the longitudinal axis (X) of the actuator 6, and each of them extends circumferentially approximately over 120°. The three jaws 27 are linked together "two-by-two" by at least one and preferably a plurality of connectors. The at least one connector preferably includes one or more pins 34 cooperating with an equal number of springs 35 in order to elastically urge the two adjacent jaws 27 towards each other, with holes 36 and 37 being provided on the frustoconical portion 29 of each jaw 27. In other words, each jaw 27 preferably has first and second holes 36, 37, respectively, and the at least one connector includes three pins 34 and three springs 35. Each pin 34 is slidably disposed within the first hole 36 of one jaw 27 and is fixedly disposed within the second hole 37 of another one of the jaws 27. Further, each spring 35 is disposed within a separate one of the jaw first holes 36 and is arranged to bias the portion of the pin 34 disposed within the particular hole 36 so as to bias the other jaw 27 toward the one jaw 27 in which the spring 35 is located. As such, the three springs 35 thereby bias all the jaws 27 generally toward each other in the closed position.

The frustoconical portion 29 has two edge guiding surfaces 38, 39. Each guiding surface 38, 39 has a stepped profile and respectively includes an upper section 38a, 39a and a lower part 38b, 39b. The upper surface section 38a of a jaw 27 defines with the upper section 39a of an adjacent jaw 27 an upper guiding passage 40 between two adjacent jaws 27. In other words, the two upper surface sections 38a of each pair of adjacent jaws 27 defines the upper guiding passage 40. Similarly, the lower surface section 38b of a jaw 27 defines with the lower surface section 39b of an adjacent jaw 27 a lower guiding passage 41 between two adjacent jaws 27. That is, the two lower surface sections 39a of each pair of adjacent jaws 27 defines a lower guiding passage 41. Further, the upper guiding passage 40 is narrower than the lower guiding passage 41.

A locking element 42 includes a sleeve 43 having at one of its ends a conical portion 44. The conical portion 44 includes an internal frustoconical surface 45 in contact with the corresponding external surfaces of the frustoconical portion 29 of the jaws 27. The sleeve 43 is thus mounted radially externally with respect to the jaws 27 so as to surround the jaws 27. The device 2 is therefore particularly compact in radial cross-section. The sleeve 43 includes a head 46 secured on the end of the sleeve 43 opposite the conical portion 44. The locking element 42 is maintained in position by a helical spring 47 mounted between the conical portion 44 and the cylinder 8.

In the illustrated embodiment, a spacing ring 48 is mounted on the piston 10, extending axially towards the sleeve 43. The spacing ring 48 has a reinforced portion 49 in contact with a spring 50. The spring 50 may be, in another example, directly in contact with the piston 10 without contacting an intermediate element such as the spacing ring 48.

Three radially protruding elements 51 are mounted in the conical portion 44 of the sleeve 43. Each element 51 extends through the upper passage 40 or the lower passage 41 between two adjacent jaws 27. Therefore, due to the elements 51, the jaws 27 are maintained at a variable distance one from the each other.

A cross-piece 52 is secured on the upper part 39a of each jaw 27 by any appropriate means and is adapted to cooperate with the upper part 38a of the adjacent corresponding upper part 38a of the jaw 27. For example, a cross-piece 52 may be mounted on each of the upper parts 38a and 39a of the guiding surfaces 38 and 39 of each jaw 27 so as to face each other. Or, the cross-piece 52 may be substituted by one protruding portion of the upper part 39a of each jaw or by two protruding portions of each upper part 38a and 39a of each jaw.

Three compression springs 53 are mounted in the flange 17 of the piston 10 and extend between the piston 10 and the washer 33. The springs 53 are located at 120° from each other, in other words, the springs 53 are evenly spaced circumferentially. The dimensions of these springs 53 depend on the weight of the jaws 27 and on the axial force exerted by the helical spring 47. The springs 53 exert an axial force on the washer 33 so as to allow a slight adaptation of the axial position of the jaws 27 so that the jaws 27 engage suitably in the threads of the threaded rod 1b ensuring satisfactory cooperation and avoiding any risk of damage to the threads. The jaws 27 are thus displaced essentially radially with a possibility of an axial displacement. The washer 33 allows a rotation of the jaws 27 without damaging the springs 53.

The tensioning device as illustrated operates in the following way.

The tensioning device illustrated in FIG. 1 is in an open position of the jaws 27, in which the jaws 27 are disengaged from the threaded rod 1. One or several threaded rods 1 are mounted on the structure 4. A tensioning device 2 is then positioned on each threaded rod 1 to be tensioned. The actuator 6 is lowered down towards the surface 4a of the structure 4 until the edge of the axial portion 12 of the tubular sleeve 9 contacts the surface 4a. Due to the spacing of the jaws 27, the actuator 6 may surround the threaded rod 1.

Figure 2:
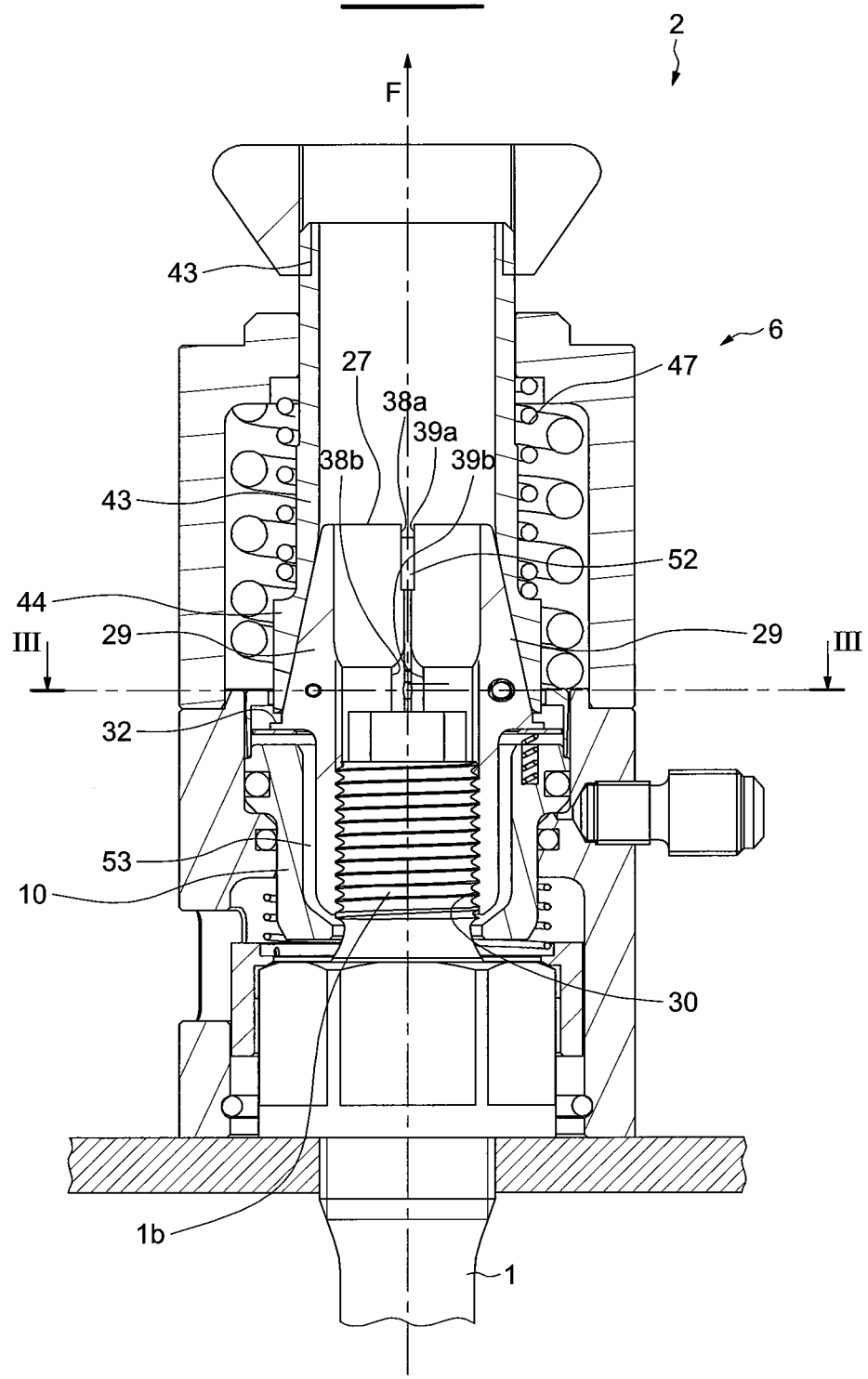
FIG. 2 is an axial half-section of the tensioning device in a the condition "jaws closed & tensioning pressure off"

The tensioning device illustrated in FIG. 2 represents a closed position of the jaws 27, in which the jaws 27 are engaged with the threaded rod 1. In order to reach this condition, one first position the actuator 6 around the threaded rod 1. Then, the sleeve 43 is pushed downwards by manual of pneumatic means so as to slide axially on the jaws 27 towards the shoulder 32 of the frustoconical portion 29. The conical portion 44 surrounds the frustoconical portion 29 of the jaws 27. Upon this sliding movement, the spring 47 located between the conical portion 44 and a surface of the cylinder 8 is progressively decompressed. Simultaneously, each radially protruding element 51 (see FIGS. 1 and 3) slides on the guiding surfaces 38 and 39 of two adjacent jaws 27, first inside the upper passage 40, and then inside the lower passage 41. Since the upper passage 40 is circumferentially narrower than the lower passage 41, the jaws 27 are positively urged in the closed position illustrated on FIG. 2 due to the resilient action of the springs 35 and the pins 34. The internal threaded surface 30 comes in contact with the threaded portion 1b of the rod 1, and both threaded surfaces mate so that the internal threaded surface 30 of the jaws 27 are engaged from the threaded portion 1b of the rod 1 to be tensioned. Since each jaws 27 move radially towards the threaded rod 1 and the piston 10 maintains the same position as illustrated in FIG. 1, a radial clearance 53 is created between the jaws 27 and the piston 10.

The upper surface sections 38a and 39a of two adjacent jaws 27 come in respective contact through the cross-piece 52, so that a clearance is maintained between two adjacent jaws 27 due to the presence of the cross-piece 52.

Figure 3:
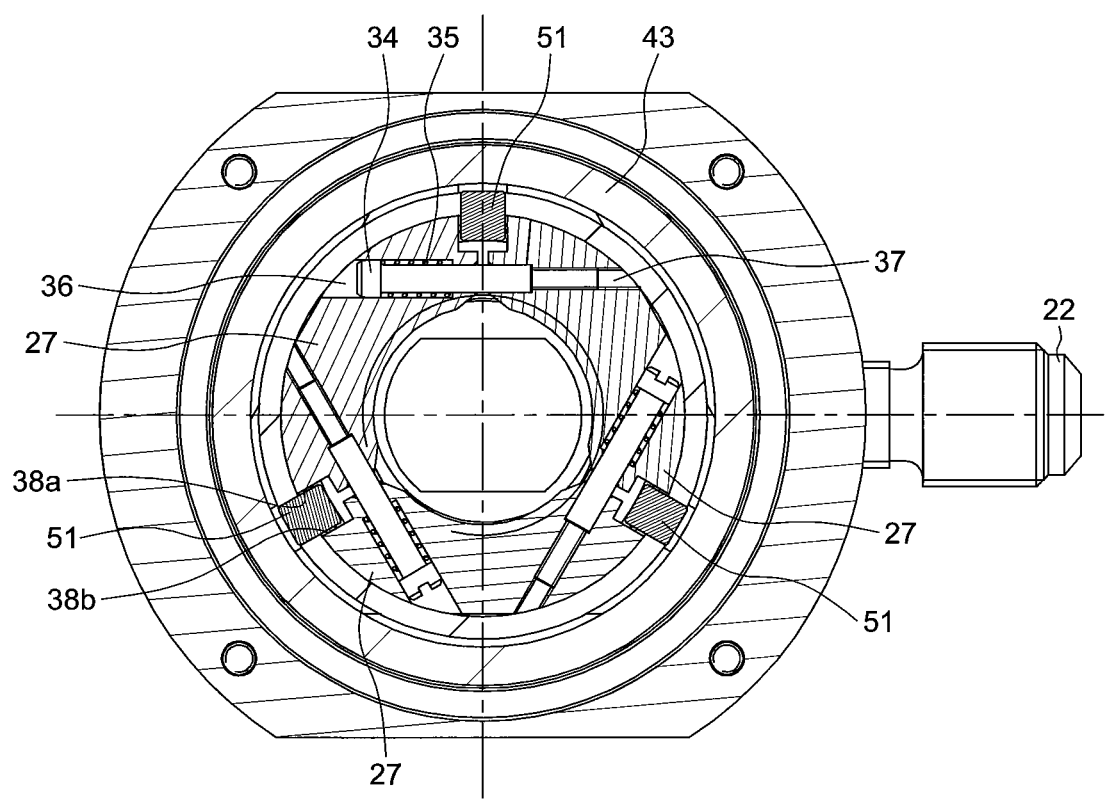
FIG. 3 represents a cross-section according to the line III-III of FIG. 2.

FIG. 3 represents a cross-section according to line III-III of FIG. 2. As shown on FIG. 3 in the closed position of the jaws 27, the three jaws 27 are surrounding the rod 1 and are maintained together due to the pins 34 and the springs 35 cooperating with the pins 34 and located in the holes 36 and 37. The radially protruding elements 51 located on the sleeve 43 are located between the lower parts 38b and 39b of the jaws 27.

Figure 4:
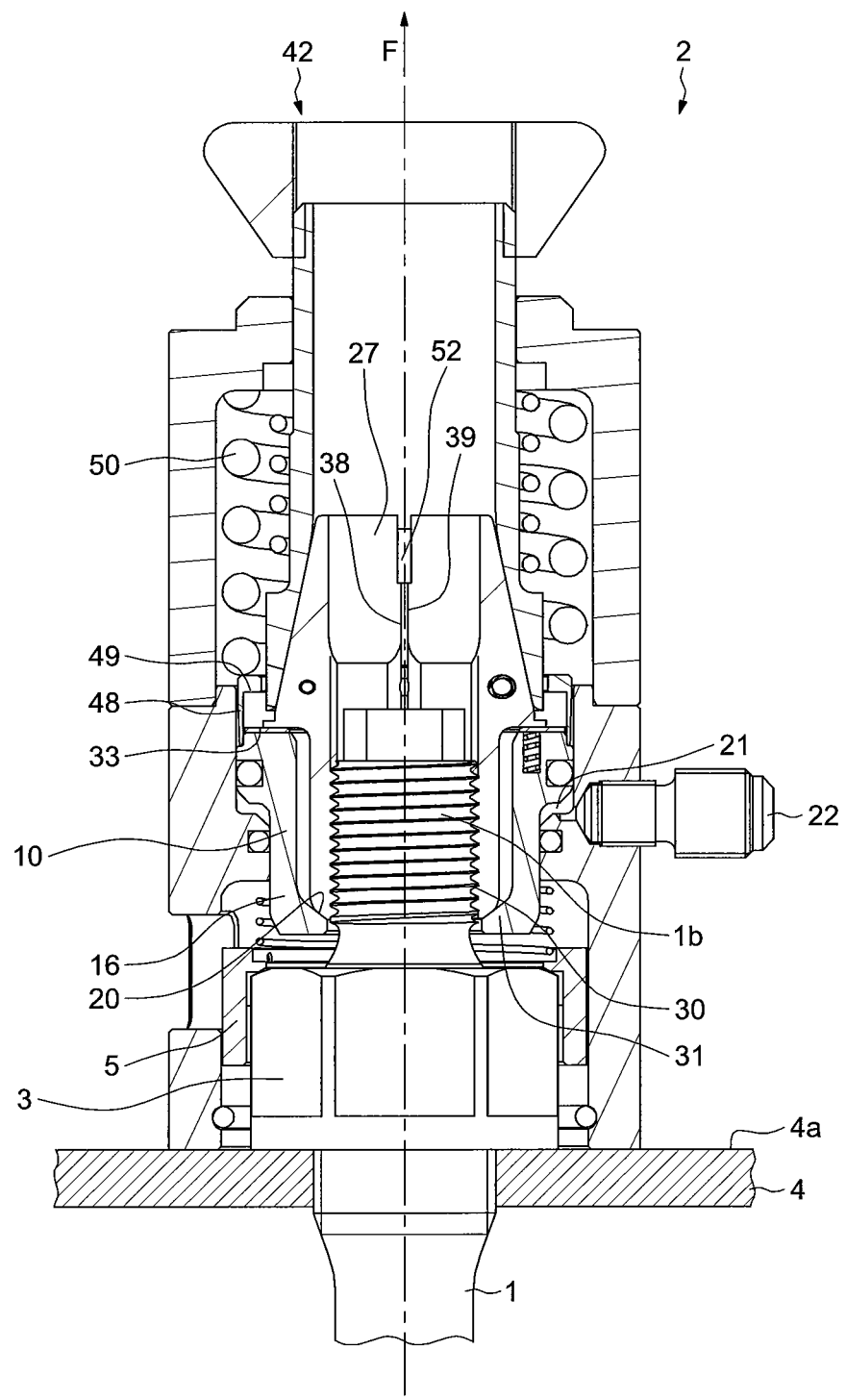
FIG. 4 is an axial half-section of the tensioning device in the condition "jaws closed and tensioning pressure on"

The tensioning device 2 illustrated in FIG. 4 represents a closed position of the jaws 27, in which the rod 1 is pre-stressed. The means 22 are adapted to supply fluid under-pressure into the annular chamber 21. The piston 10 slides upwards towards the washer 33. The frustoconical surface 20 of the piston 10 contacts the corresponding surface 31 of the jaws 27.

The spacing ring 48 mounted on the piston 10 slides with the piston 10 so as to exert on the rod 1 the axial force F. The spring 50 is thus compressed by the reinforced portion 49 of the spacing ring 48. Due to the cross-piece 52, the frustoconical portion 29 is not deformed when the piston slides and exerts the axial force F on the rod 1. In particular, the presence of at least one cross-piece 52 near the upper edge of the frustoconical portion 29 of the jaws 27 ensures that the frustoconical portion 29 is not deformed, so that the sleeve 43 can slide downwards without any risk of self locking of the jaws 27 and blocking of the tensioning device.

The piston 10 transmits the axial tensioning force F through the jaws 27 to the threaded rod 1. Once the axial force F has been transmitted to the rod 1, the fitting-up wrench 5 is activated by any appropriate means such as an electric motor so as to fit-up the nut 3 on the surface 4a. After fitting-up of the nut 3, the pressure is released in the chamber 21 so as to cancel the tensioning force exerted by the tensioning device 2. Upon decompression inside the chamber 21, the spring 50 decompresses and provides an axial effort to the spacing ring 48, which allows the piston 10 to slide downwards.

The locking element 42 is then moved upwards by manual or pneumatic means (not illustrated) so as to engage the radially protruding element 51 between the edge guiding surfaces 38 and 39 of the jaws 27 and to disengage the internal threaded surface 30 from the threaded end 1b.

Figure 5:
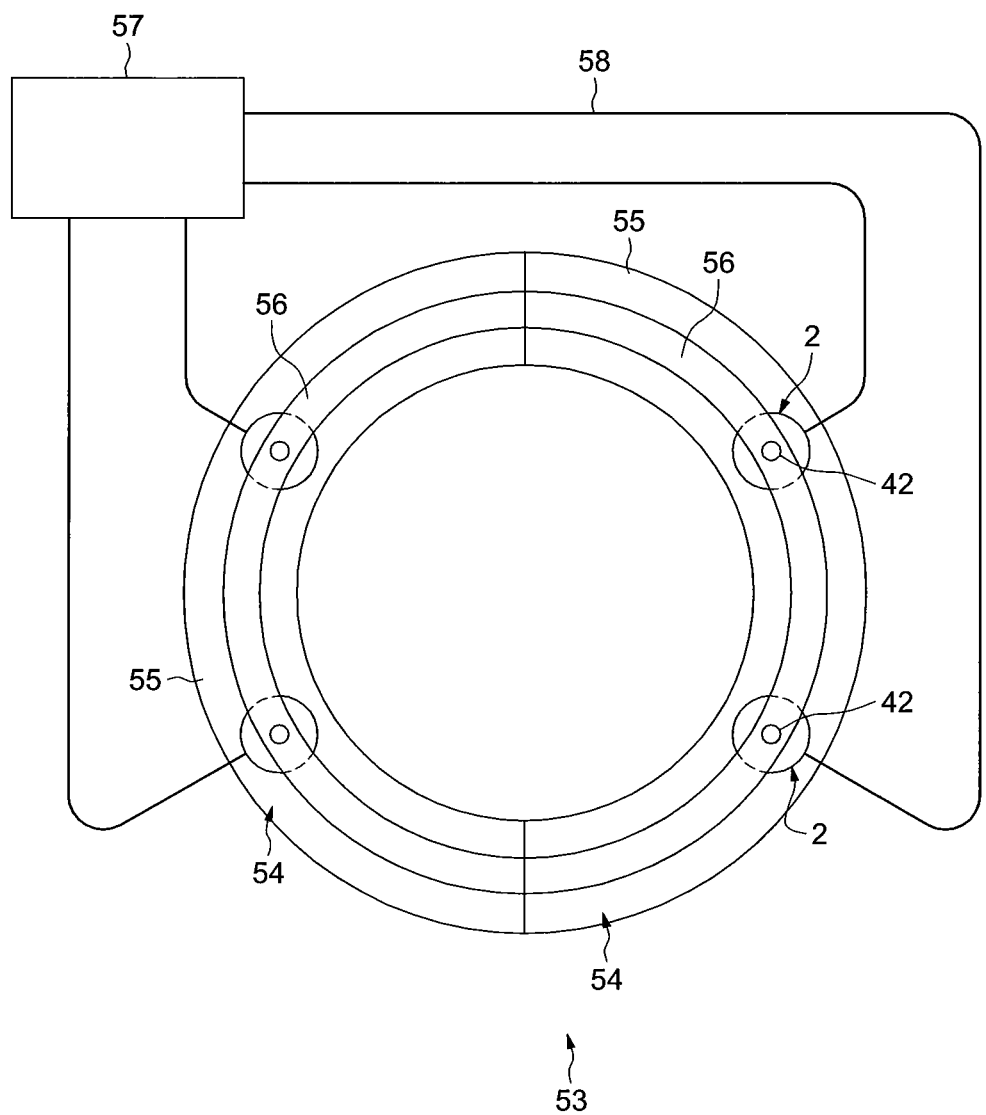
FIG. 5 is a schematic of a tensioning system according to the invention.

The invention may be advantageously used for tensioning several rods simultaneously on a structure. For example, a device comprising two half rims or one single rim can have several tensioning devices in order to tighten several rods simultaneously on a structure. As illustrated in FIG. 5, a tensioning system 53 comprises two identical rims 54 for tensioning threaded rods 1. Each rim 54 is, as illustrated, a 180° circular monobloc being assembled together in a reversible way with assembling means (not illustrated). Each rim 54 comprises a semi-circular annular plate 55 bearing a plurality of tensioning devices 2 as described above. Only two such tensioning devices 2 have been shown in FIG. 5 by way of example. In practice, more tensioning devices 2 are mounted on the plate 55. The tensioning devices 2 are located circumferentially on the semi-annular support plate 55. A locking plate 56 is adapted to act simultaneously on each locking element 42. Such a locking plate 56 can be actuated by any type of actuator, such as, for example, a hydraulic, pneumatic, electrical or electromagnetic device.

A hydraulic unit 57 is connected to each tensioning device 2 via lines 58.

Once each of the corresponding threaded rods 1 has been fitted with a nut 3 (as illustrated in FIG. 1), the support plate 55 is arranged in such a way that the tensioning devices 2 cover the end of the threaded rods. The jaws are then urged in a closed position by pressing on the locking plate 56 so as to simultaneously push the locking elements 42. A pressurized fluid is supplied via lines 58 of the hydraulic unit 57 into all tensioning devices 2 in order to exert the axial force simultaneously to all threaded rods. The nuts are then fitted-up with driving means (not illustrated) adapted to act on each fitting-up wrench 5. The tension exerted on each tensioning device 2 is then released simultaneously by operating the hydraulic unit 57.

The specific structure of the tensioning device of the invention is particularly compact since the sleeve is mounted outside of the jaws and since the connecting means for connecting two jaws together is mounted inside the jaws. The jaws are guided very precisely due to the frustoconical surfaces and are locked in a secured way. Moreover, the risk of self locking of the jaws is avoided.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A rod tensioning device for tensioning a rod, the rod having a threaded portion, the rod tensioning device comprising:
    an actuator adapted to provide a tensioning axial force;
    a tie-rod adapted to transmit the tensioning axial force from the actuator to the threaded portion of the rod and including a plurality of jaws, the plurality of jaws being movable radially between a closed position at which the plurality of jaws are engaged with the threaded portion and an open position at which the plurality of jaws are disengaged from the threaded portion, each of the plurality of jaws having an outer surface; and
    a locking element including a sleeve slidable axially along the tie-rod and disposable about the plurality of jaws, the sleeve having an inner frustoconical surface contactable with the outer surfaces of the plurality of jaws,
    wherein each of the plurality of jaws includes a cylindrical portion having an internal threaded surface adapted to engage with the threaded portion of the rod and a frustoconical portion delimited by two edge guiding surfaces each having a stepped profile,
    wherein the sleeve includes three radially protruding elements, each of the three radially protruding elements being adapted to slide between the edge guiding surfaces of two adjacent jaws, and
    wherein each of the two edge guiding surfaces includes an upper surface section and a lower surface section, the plurality of jaws being arranged such that the upper surface sections of each pair of adjacent jaws define an upper guiding passage and the two lower surface sections of each pair of adjacent jaws define a lower guiding passage, each of the upper guiding passages being narrower than each of the lower guiding passages.

2. The rod tensioning device according to claim 1, wherein the tie-rod has a central axis and the plurality of jaws includes three substantially identical jaws, each of the three substantially identical jaws extending circumferentially about 120° around the central axis, the tie-rod further including at least one connector configured to connect the three substantially identical jaws.

3. The rod tensioning device according to claim 2, wherein each of the plurality of jaws has first and second holes and the at least one connector includes three pins and three springs, each of the three pins being slidably disposed within the first hole of a separate one of the plurality of jaws and fixedly disposed within the second hole of another one of the plurality of jaws, each of the three springs being disposed within a separate one of the first holes and arranged to bias the pin disposed within the particular first hole so as to bias two of the plurality of jaws toward each other in the closed position.

4. The rod tensioning device according to claim 1, wherein the plurality of jaws are in the closed position when the three radially protruding elements are disposed between the lower sections of the edge guiding surfaces and the plurality of jaws are in the open position when the three radially protruding elements are disposed between the upper surface sections of the edge guiding surfaces.

5. The rod tensioning device according claim 1, wherein the actuator includes a tubular sleeve surrounding the threaded portion of the rod, a cylinder in contact with the tubular sleeve, and a piston slidable axially within the tubular sleeve.

6. The rod tensioning device according to claim 5, wherein each of the plurality of jaws has an outer frustonical surface and the piston includes an inner frustoconical surface contactable with the outer frustoconical surfaces of the plurality of jaws.

7. The rod tensioning device according to claim 5, wherein the actuator includes means for supplying a fluid under pressure into an annular chamber to bias the piston and the tie-rod with the plurality of jaws in the closed position so as to provide the tensioning axial force.

8. The rod tensioning device according to claim 7, wherein the actuator includes a spring configured to bias the piston so as to exert the tensioning axial force on the rod.

9. The rod tensioning device according to claim 1, wherein the frustoconical portion of each of the plurality of jaws includes a washer and a shoulder extending radially towards the actuator and adapted to rest against the washer.

10. The rod tensioning device according to claim 9, wherein the actuator further includes three springs spaced circumferentially about 120° apart from each other, mounted in the piston, and extending between the piston and the washer, the springs exerting axial force on the washer.

11. A rim for tensioning threaded rods comprising:
at least two tensioning devices for tensioning a rod having a threaded portion, each tensioning device including:
an actuator adapted to provide a tensioning axial force;
a tie-rod adapted to transmit the tensioning axial force from the actuator to the threaded portion of the rod and including a plurality of jaws, the plurality of jaws being movable radially between a closed position at which the plurality of jaws are engaged with the threaded portion and an open position at which the plurality of jaws are disengaged from the threaded portion, each of the plurality of jaws having an outer surface; and
a locking element including a sleeve slidable axially along the tie-rod and disposable about the plurality of jaws, the sleeve having an inner frustoconical surface matingly contactable with the outer surfaces of the plurality of jaws;
a semi-circular annular plate bearing the at least two tensioning devices; and
a locking plate adapted to act simultaneously on the locking element of each of the at least two tensioning devices,
wherein each of the plurality of jaws includes a cylindrical portion having an internal threaded surface adapted to engage with the threaded portion of the rod and a frustoconical portion delimited by two edge guiding surfaces each having a stepped profile,
wherein the sleeve includes three radially protruding elements, each of the three radially protruding elements being adapted to slide between the edge guiding surfaces of two adjacent jaws, and
wherein each of the two edge guiding surfaces includes an upper surface section and a lower surface section, the plurality of jaws being arranged such that the upper surface sections of each pair of adjacent jaws define an upper guiding passage and the two lower surface sections of each pair of adjacent jaws define a lower guiding passage, each of the upper guiding passages being narrower than each of the lower guiding passages.

12. The rim according to claim 11, further comprising driving means adapted to cooperate with wrenches cooperating with nuts mounted on the threaded rods.

13. The rim according to claim 11, wherein the rim includes one of a semi-circular monobloc and a substantially circular monobloc.

14. A tensioning system comprising:
two rims, each of the two rims being a semi-circular monobloc and including:
at least two tensioning devices for tensioning a rod having a threaded portion, each of the at least two tensioning devices including:
an actuator adapted to provide a tensioning axial force;
a tie-rod adapted to transmit the tensioning axial force from the actuator to the threaded portion of the rod and including a plurality of jaws, the plurality of jaws being movable radially between a closed position at which the plurality of jaws are engaged with the threaded portion and an open position at which the plurality of jaws are disengaged from the threaded portion, each of the plurality of jaws having an outer surface; and
a locking element including a sleeve slidable axially along the tie-rod and disposable about the plurality of jaws, the sleeve having an inner frustoconical surface matingly contactable with the outer surfaces of the plurality of jaws;
a semi-circular annular plate bearing the at least two tensioning devices; and
a locking plate adapted to act simultaneously on the locking element of each of the at least two tensioning devices,
wherein each of the plurality of jaws includes a cylindrical portion having an internal threaded surface adapted to engage with the threaded portion of the rod and a frustoconical portion delimited by two edge guiding surfaces each having a stepped profile,
wherein the sleeve includes three radially protruding elements, each of the three radially protruding elements being adapted to slide between the edge guiding surfaces of two adjacent jaws, and
wherein each of the two edge guiding surfaces includes an upper surface section and a lower surface section, the plurality of jaws being arranged such that the upper surface sections of each pair of adjacent jaws define an upper guiding passage and the two lower surface sections of each pair of adjacent jaws define a lower guiding passage, each of the upper guiding passages being narrower than each of the lower guiding passages; and
assembling means adapted to assemble the rims together in a reversible way.

\* \* \* \* \*